US008812186B2

(12) United States Patent
Oh et al.

(10) Patent No.: US 8,812,186 B2
(45) Date of Patent: Aug. 19, 2014

(54) DRIVING MODE CHANGING METHOD AND APPARATUS OF AUTONOMOUS NAVIGATION VEHICLE

(71) Applicant: Hyundai Motor Company, Seoul (KR)

(72) Inventors: Young Chul Oh, Gyeonggi-do (KR); Myung Seon Heo, Seoul (KR); Byung Yong You, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/902,024

(22) Filed: May 24, 2013

(65) Prior Publication Data
US 2014/0188322 A1 Jul. 3, 2014

(30) Foreign Application Priority Data

Dec. 27, 2012 (KR) .................. 10-2012-0155001

(51) Int. Cl.
G06D 1/00 (2006.01)
(52) U.S. Cl.
USPC .......................................................... 701/23
(58) Field of Classification Search
CPC .................................................... B60W 50/08
See application file for complete search history.

(56) References Cited

U.S. PATENT DOCUMENTS

| 5,774,069 | A  | * | 6/1998  | Tanaka et al. ............... 340/903 |
| 6,181,996 | B1 | * | 1/2001  | Chou et al. .................... 701/36 |
| 8,423,231 | B2 | * | 4/2013  | Breuer et al. ................ 701/29.2 |
| 2003/0095179 | A1 | * | 5/2003 | Kaminaga et al. ............ 348/118 |
| 2007/0219709 | A1 | * | 9/2007 | Ikeda ............................ 701/207 |
| 2007/0291130 | A1 | * | 12/2007 | Broggi et al. ............... 348/218.1 |
| 2007/0293989 | A1 | * | 12/2007 | Norris .......................... 700/249 |
| 2009/0287367 | A1 |   | 11/2009 | Salinger |
| 2011/0071718 | A1 | * | 3/2011  | Norris et al. ................... 701/23 |
| 2011/0125344 | A1 |   | 5/2011  | An et al. |
| 2012/0083959 | A1 | * | 4/2012  | Dolgov et al. ................. 701/23 |
| 2012/0271500 | A1 | * | 10/2012 | Tsimhoni et al. .............. 701/23 |
| 2012/0293316 | A1 | * | 11/2012 | Johnson et al. .............. 340/438 |
| 2013/0179031 | A1 | * | 7/2013  | Whelan et al. ................ 701/36 |

FOREIGN PATENT DOCUMENTS

| DE | 102009037680 A1 | * | 2/2011 |
| JP | H09-160643 A    |   | 6/1997 |
| KR | 10-2011-0058384 |   | 6/2011 |
| KR | 101063302       |   | 9/2011 |

OTHER PUBLICATIONS

Christoph Waller, Sangwoo Lee, "Motor vehicle cockpit unit, for at least two seats side-by-side, has a steering unit sliding on the instrument panel for driving from a selected front seat" Machine Translation of German Patent Application 10-2009-037680, published Feb. 17, 2011, pp. 1-12.*

* cited by examiner

Primary Examiner — John R Olszewski
Assistant Examiner — Navid Ziaeianmehdizadeh
(74) Attorney, Agent, or Firm — Edwards Wildman Palmer LLP; Peter F. Corless

(57) ABSTRACT

A driving mode changing method and apparatus of an autonomous navigation vehicle that allows a driver to stably operate the autonomous navigation vehicle. The autonomous navigation vehicle may be stably operated by mounting an apparatus (a touch pad, a joystick, or the like) to operate the autonomous navigation vehicle on seats (a passenger seat and a rear seat) other than a driver seat of the autonomous navigation vehicle and providing various information (a near around view, a far around view, a critical level, vehicle information, and the like) to drive the autonomous navigation vehicle.

9 Claims, 3 Drawing Sheets

DRIVING MODE CHANGING METHOD AND APPARATUS OF AUTONOMOUS NAVIGATION VEHICLE

CROSS-REFERENCE TO RELATED APPLICATION

This application is based on and claims priority from Korean Patent Application No. 10-2012-0155001, filed on Dec. 27, 2012 in the Korean Intellectual Property Office, the disclosure of which is incorporated herein in its entirety by reference.

BACKGROUND OF THE INVENTION

1. Field of the Invention

The present invention relates to a driving mode changing method and apparatus of an autonomous navigation vehicle, and more particularly, to a technology that stably ends an autonomous navigation mode by efficiently transferring a control of the autonomous navigation vehicle to a driver even when the driver is not seated on a driver seat during a failure of the autonomous navigation vehicle.

2. Description of the Prior Art

An unmanned (e.g., an autonomous) vehicle performs a task in various environments, for example, the unmanned vehicle is autonomously navigated until a task is input through an optimal path that is safe and rapid. The autonomous navigation technology of the unmanned vehicle includes layers such as global path-planning (GPP) and local path-planning (LPP) based on a detection region of a sensor mounted within the unmanned vehicle.

In the global path-planning, which is a consideration layer, a reasonable path up to a given object point is set off-line based on a large-scale topographical feature such as a mountain or a lake and a duty risk degree based on a pre-provided digital elevation map (DEM)/digital surface map (DSM) and feature data base (FDB).

In the local path-planning, which is a more responsive layer, topographical information and various obstacle information such as a topological gradient and roughness are extracted from world modeling data within several tens of meters that are the most recently obtained by various sensors, and a movement path up to the next passing point generated in the global path-planning is set in real time in view of safety and stability using the extracted information.

The autonomous navigation vehicle changes a driving mode to a manual driving mode when a failure is detected. In other words, a control of the autonomous navigation vehicle is switched to a driver to allow the driver to drive the autonomous navigation vehicle. Therefore, when the driver is not positioned on a driver seat, but is positioned on for example, a rear seat, the driving mode of the autonomous navigation vehicle may not be changed to the manual driving mode.

SUMMARY

Accordingly, the present invention provides a driving mode changing method and apparatus of an autonomous navigation vehicle that allow a driver to stably operate the autonomous navigation vehicle by providing an apparatus (e.g., a touch pad, a joystick, or the like) that operates the autonomous navigation vehicle on seats (e.g., a passenger seat and a rear seat) other than a driver seat of the autonomous navigation vehicle and providing various information (e.g., a near around view, a far around view, a critical level, vehicle information, and the like) for driving the autonomous navigation vehicle.

In one aspect of the present invention, a driving mode changing apparatus of an autonomous navigation vehicle may include at least one operating apparatus, the driving mode changing apparatus including a plurality of units executed by a controller having a processor and a storage device. The plurality of units may include: a failure detecting unit configured to detect a failure of the autonomous navigation vehicle; a driver sensing unit configured to sense a position of a driver in the autonomous navigation vehicle; an information collecting unit configured to switch a control of the autonomous navigation vehicle to the operating apparatus corresponding to the position of the driver sensed by the driver sensing unit and transfer various information required for driving the autonomous navigation vehicle to an information display unit corresponding to the position of the operating apparatus; wherein the information collecting unit may be configured to collect various information required to drive the autonomous navigation vehicle; and at least one information displaying unit configured to display various information collected by the information collecting unit.

In another aspect of the present invention, a driving mode changing method of an autonomous navigation vehicle including at least one operating apparatus, the driving mode changing method may include: detecting, by a controller, a failure of the autonomous navigation vehicle; sensing, by the controller using a sensor, a position of a driver in the autonomous navigation vehicle; switching, by the controller, a control of the autonomous navigation vehicle to the operating apparatus corresponding to the sensed position of the driver; transferring, by the controller, various collected information required to drive the autonomous navigation vehicle, to an information display unit corresponding to a position of the operating apparatus; displaying, by the controller, the transferred information.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described in detail with reference to the accompanying drawings.

Figure 1:
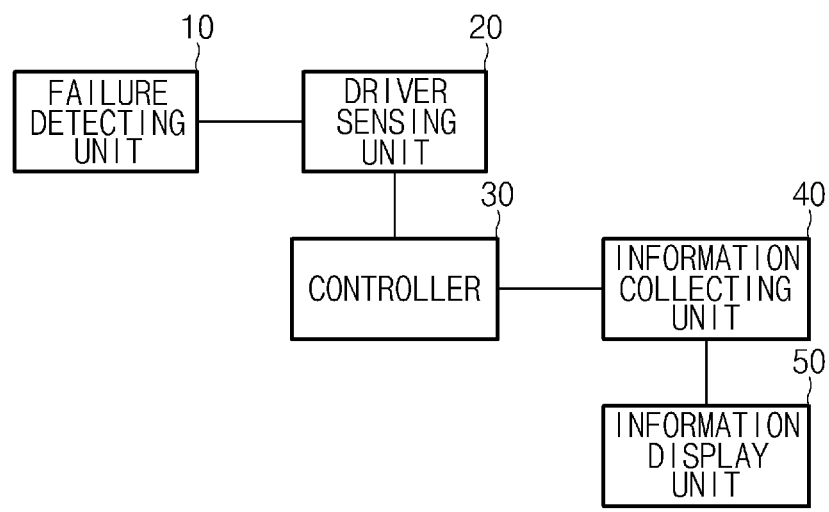
FIG. 1 is an exemplary diagram of a driving mode changing apparatus of an autonomous navigation vehicle according to an exemplary embodiment of the present invention.

FIG. 1 is an exemplary diagram of a driving mode changing apparatus of an autonomous navigation vehicle according to an exemplary embodiment of the present invention. As shown in FIG. 1, the driving mode changing apparatus of an autonomous navigation vehicle may include a plurality of units executed by a controller 30 having a processor and a storage device. The plurality of units may include a failure detecting unit 10, a driver sensing unit 20, an information collecting unit 40, and an information display unit 50.

Prior to describing the above-mentioned respective units, a driver seat and a rear seat of the autonomous navigation vehicle according to the exemplary embodiment of the present invention may have the information display unit 50 mounted thereto, wherein the information display unit 50 may be configured to display various information required to operate the autonomous navigation vehicle as well as an operating apparatus. Therefore, the driver may take over a control even when seated on the rear seat to manually operate the autonomous navigation vehicle. In particular, the operating apparatus may be implemented in a touch pad form or a joystick form. This operating apparatus may control the autonomous navigation vehicle to be accelerated or decelerated and may include an emergency stop button to stop the autonomous navigation vehicle at any time.

Recently, as a law for an unmanned autonomous navigation vehicles may be approved in various states (e.g., Nevada and Florida), the autonomous navigation vehicle and a general vehicle may be navigated together on a general road.

Therefore, the control may be switched to the driver while changing a mode of the autonomous navigation vehicle to the manual driving mode when a failure of the autonomous navigation vehicle is detected, thereby allowing the driver to operate the failed autonomous navigation vehicle to prevent damage to neighboring vehicles.

The failure detecting unit 10 may be configured to detect a failure of the autonomous navigation vehicle. In other words, the failure detecting unit 10 may be configured store a value output when various devices in the autonomous navigation vehicle are in a normal state (e.g., no failure has been detected) and detect that the failure has been generated in the autonomous navigation vehicle when any one device outputs an abnormal value, particularly, when a device that has a direct effect on navigation of the autonomous navigation vehicle is abnormal. In this case, since the autonomous navigation vehicle may not be repaired automatically, the vehicle should be manually operated to move to a safe region.

The driver sensing unit 20 may be configured to sense a position of the driver within the autonomous navigation vehicle. Since the autonomous navigation vehicle may include the operating apparatus and the information displaying unit 50 disposed on the rear seat, the position of the driver may be sensed before the control is switched to the driver when determining whether the autonomous navigation vehicle has experienced a failure. Furthermore, the driver sensing unit 20 may be configured to sense the position of the driver based on an image obtained by an imaging device (e.g., a camera) disposed within the autonomous navigation vehicle, sense the position of the driver using an infrared sensor, or sense the position of the driver by detecting whether a seat belt is used.

The information collecting unit 40 may be configured to switch the control of the autonomous navigation vehicle to the operating apparatus corresponding to the position of the driver sensed by the driver sensing unit 20 and transfer information required to drive the autonomous navigation vehicle to the information display unit 50 corresponding to the position of the operating apparatus. In other words, the controller 30 may be configured to activate the operating apparatus disposed at a corresponding position when the position of the driver is sensed, thereby enabling a manual operation by the driver.

In addition, the information collecting unit 40 may be configured to transfer various information, that is, a near around view of the autonomous navigation vehicle, a far around view of the autonomous navigation vehicle, a critical level with neighboring vehicles, vehicle information in a cluster, and the like, collected by the information collecting unit 40 to the information display unit 50 corresponding to the position of the driver.

The information collecting unit 40 may be configured to collect the near around view of the autonomous navigation vehicle, the far around view of the autonomous navigation vehicle, the critical level with neighboring vehicles, the vehicle information in a cluster (including steering information), and the like, to allow the driver seated on the rear seat to operate the autonomous navigation vehicle. In addition, the information collecting unit 40 may be configured to collect information from various systems disposed within the autonomous navigation vehicle through a vehicle network.

Figure 3:
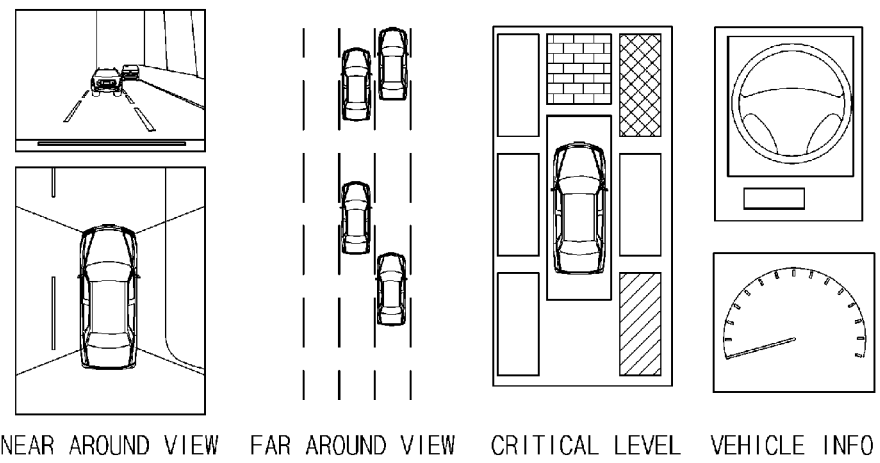
FIG. 3 is an exemplary diagram of information displayed by an information display according to the exemplary embodiment of the present invention.

The information display unit 50 may be disposed at the rear seat, or the like, within the autonomous navigation vehicle and may be configured to display various information collected by the information collecting unit 40 to allow the driver to operate the autonomous navigation vehicle. An example of the information display unit 50 is shown in FIG. 3. Here, the critical level with the neighboring vehicle may be displayed by different colors according to a risk degree.

Figure 2:
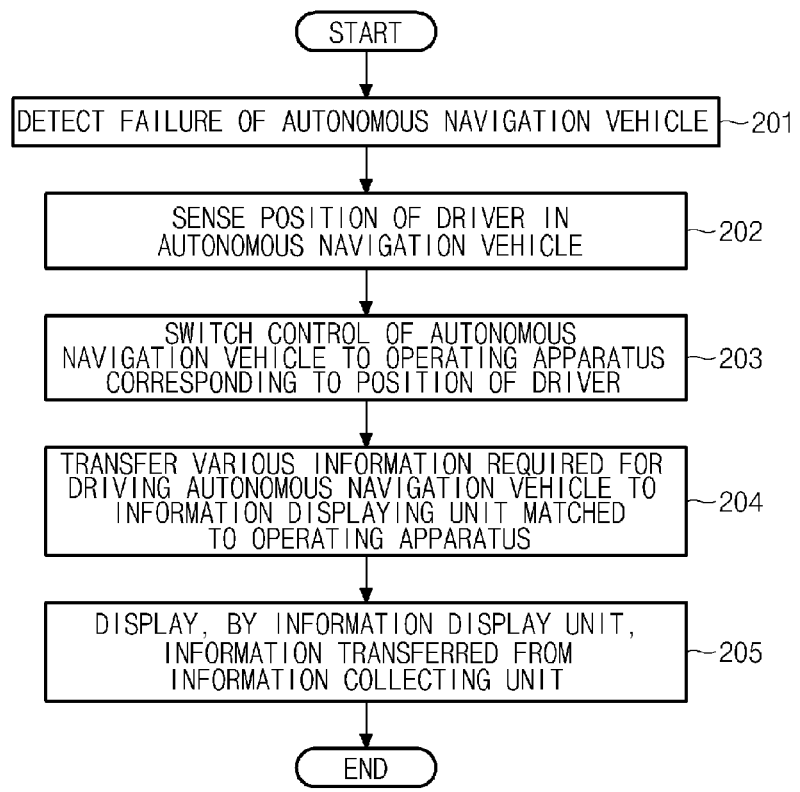
FIG. 2 is an exemplary flow chart of a driving mode changing method of an autonomous navigation vehicle according to the exemplary embodiment of the present invention.

FIG. 2 is an exemplary flow chart of a driving mode changing method of an autonomous navigation vehicle according to the exemplary embodiment of the present invention. The method may include, detecting, by a controller, a failure of the autonomous navigation vehicle (201); sensing, by the controller, a position of a driver within the autonomous navigation vehicle (202); switching, by the controller, the control of the autonomous navigation vehicle to the operating apparatus corresponding to the sensed position of the driver (203); transferring, by the controller, collected various information required to drive the autonomous navigation vehicle to an information display unit 50 corresponding to a position of the operating apparatus (204); and displaying, by the controller, the transferred information (205).

Through the above-mentioned process, the control may be switched to the driver regardless of a position of the driver in the autonomous navigation vehicle when a failure of the autonomous navigation vehicle is detected.

As set forth above, according to the exemplary embodiments of the present invention, an apparatus (e.g., a touch pad, a joystick, or the like) that operates the autonomous navigation vehicle may be disposed on vehicle seats (e.g., a passenger seat and a rear seat) other than a driver seat of the autonomous navigation vehicle, and various information (e.g., a near around view, a far around view, a critical level, vehicle information, and the like) to drive the autonomous navigation vehicle may be provided, thereby allowing a driver to stably operate the autonomous navigation vehicle. In addition, according to the exemplary embodiments of the present invention, the control may be switched to the driver regardless of a position of the driver in the autonomous navigation vehicle when a failure of the autonomous navigation vehicle is detected.

What is claimed is:

1. A driving mode changing apparatus of a vehicle including at least one operating apparatus, the driving mode changing apparatus comprising:
    a controller configured to:
        detect a failure of the vehicle;
        sense a position of a driver within the vehicle;
        switch a control of the vehicle to the operating apparatus corresponding to the sensed position of the driver at a rear seat of the vehicle;
        transfer various information required to drive the vehicle to an information display unit corresponding to the position of the operating apparatus;
        collect various information required to drive the vehicle; and
        display the various collected information on at least one information display unit.

2. The driving mode changing apparatus according to claim 1, wherein the operating apparatus is a touch pad type operating apparatus.

3. The driving mode changing apparatus according to claim 1, wherein the operating apparatus is a joystick type operating apparatus.

4. The driving mode changing apparatus according to claim 1, wherein the controller is configured to collect at least one of a near around view of the vehicle, a far around view of the vehicle, a critical level with neighboring vehicles, and vehicle information in a cluster.

5. A driving mode changing method of a vehicle including at least one operating apparatus, the driving mode changing method comprising:
    detecting, by a controller, a failure of the vehicle;
    sensing, by the controller, a position of a driver within the vehicle;
    switching, by the controller, a control of the vehicle to the operating apparatus corresponding to the sensed position of the driver at a rear seat of the vehicle;
    collecting, by the controller, various information required to drive the vehicle;
    transferring, by the controller, the various collected information to an information display unit corresponding to a position of the operating apparatus; and
    displaying, by the controller, the transferred information.

6. The driving mode changing method according to claim 5, wherein information displayed includes at least one of a near around view of the vehicle, a far around view of the vehicle, a critical level with neighboring vehicles, and vehicle information in a cluster.

7. A non-transitory computer readable medium containing program instructions executed by a processor or controller, the computer readable medium comprising:
    program instructions that detect a failure of the vehicle;
    program instructions that sense a position of a driver within the vehicle;
    program instructions that switch a control of the vehicle to the operating apparatus corresponding to the sensed position of the driver at a rear seat of the vehicle;
    program instructions that collect various information required to drive the vehicle;
    program instructions that transfer the various collected information to an information display unit corresponding to a position of the operating apparatus; and
    program instructions that display the transferred information.

8. The non-transitory computer readable medium of claim 7, wherein information display includes at least one of a near around view of the vehicle, a far around view of the vehicle, a critical level with neighboring vehicles, and vehicle information in a cluster.

9. A driving mode changing apparatus of a vehicle including at least one operating apparatus, the driving mode changing apparatus comprising:
    a controller configured to:
        sense a position of a driver within the vehicle;
        switch a control of the vehicle to the operating apparatus corresponding to the sensed position of the driver at a rear seat of the vehicle;
        transfer various information required to drive the vehicle to an information display unit corresponding to the position of the operating apparatus;
        collect various information required to drive the vehicle; and
        display the various collected information on at least one information display unit.

* * * * *